Aug. 5, 1969
V. A. KOERS
3,459,373
HIGHWAY RIGHT-OF-WAY MAINTENANCE APPARATUS
Filed March 6, 1967
2 Sheets-Sheet 1
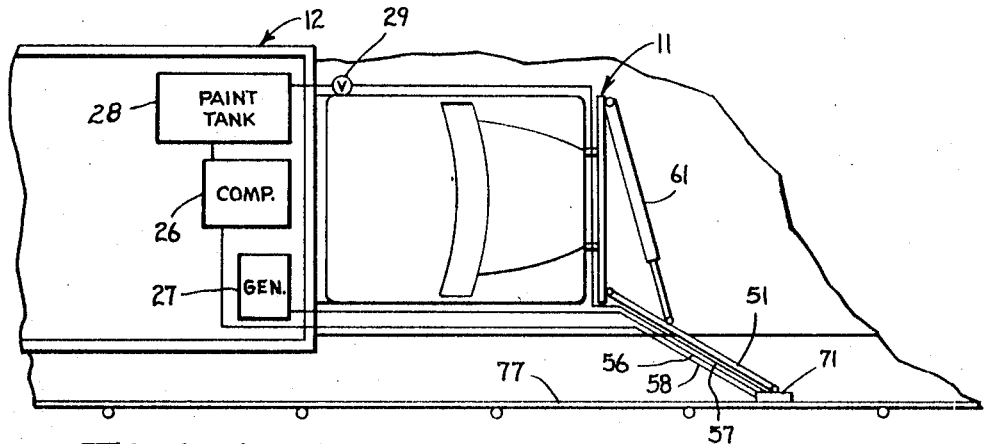
Fig. 1.
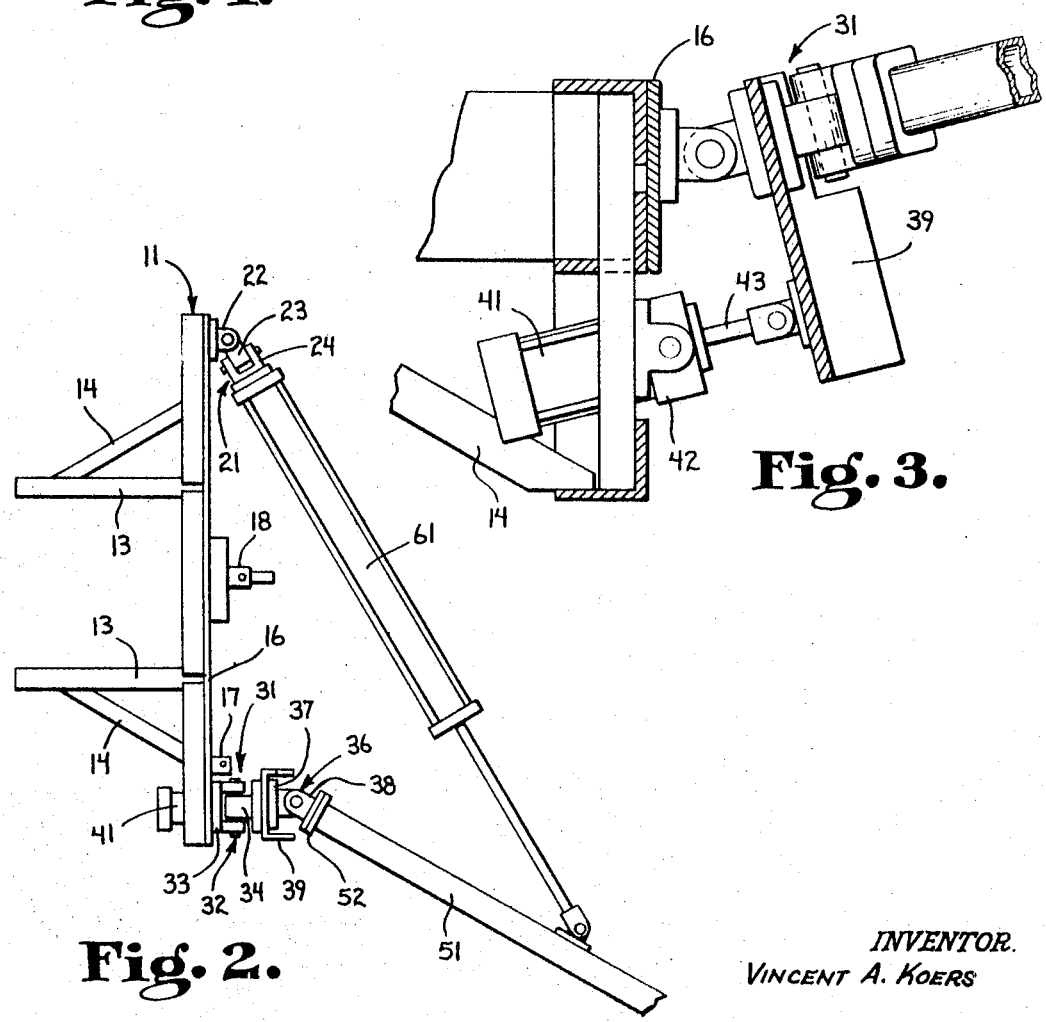
Fig. 2.
Fig. 3.
INVENTOR.
VINCENT A. KOERS
BY Woodard, Weikart, Emhardt & Naughton
Attorneys Aug. 5, 1969 V. A. KOERS 3,459,373
HIGHWAY RIGHT-OF-WAY MAINTENANCE APPARATUS
Filed March 6, 1967 2 Sheets-Sheet 2
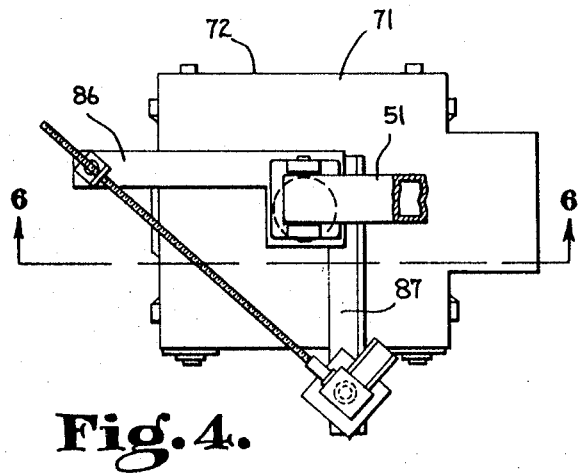
Fig. 4.
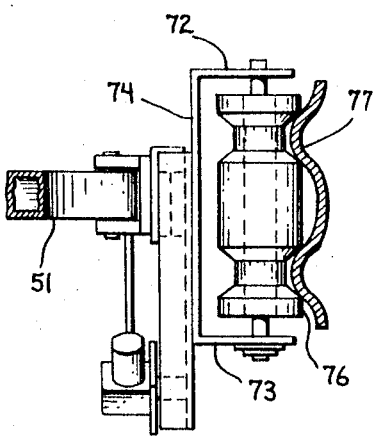
Fig. 5.
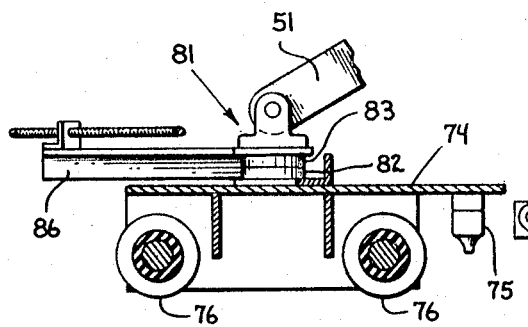
Fig. 6.
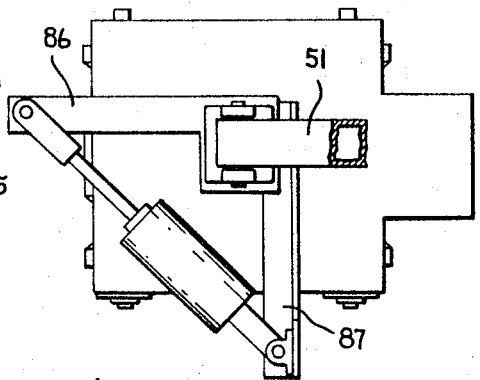
Fig. 8.
Fig. 7.
Fig. 9.
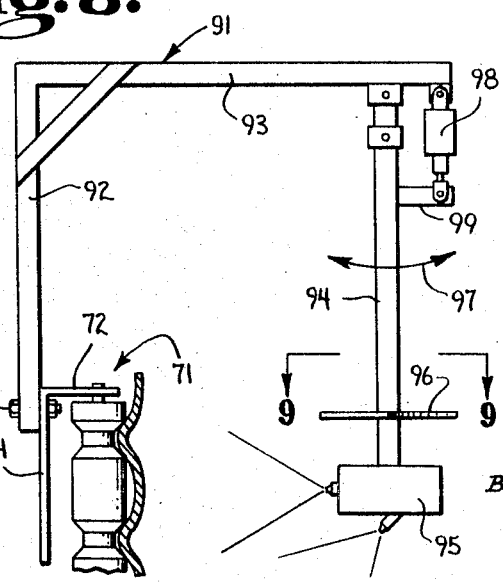
INVENTOR.
VINCENT A. KOERS
BY Woodard, Weikart, Emhardt & Naughton
Attorneys United States Patent Office 3,459,373
Patented Aug. 5, 1969

3,459,373
HIGHWAY RIGHT-OF-WAY MAINTENANCE APPARATUS
Vincent A. Koers, 5228 N. Central Ave.,
Indianapolis, Ind. 46220
Filed Mar. 6, 1967, Ser. No. 620,723
Int. Cl. B05b 7/26, 9/02
U.S. Cl. 239—1      11 Claims

ABSTRACT OF THE DISCLOSURE

A vehicle-mounted apparatus having a frame for mounting the apparatus on a vehicle, a hydraulically operated boom for supporting a guide box for piloting on a highway guardrail and for supporting miscellaneous brushing, spraying, sandblasting and other devices for maintaining guardrails and treating the ground area in the vicinity of guardrails.

Background of the invention

*Field of the invention.*—The present invention relates to the fields of fluid sprinkling, spraying and diffusing, and to vehicle-mounted equipment for accomplishing same.

*Description of the prior art.*—There have been many advancements in highway maintenance, for example, vehicle-mounted center line painting apparatus, weed cutters, snow removal equipment and others too numerous to mention. Maintenance of highway guardrails and the ground area around them, however, is still performed generally by hand, with hand-held sprayers or brushes. Performing this maintenance manually is slow and expensive. The need has long existed for a rapid, inexpensive method and apparatus for maintaining these portions of a highway, and with the increasing number of miles of limited access highway, the need is even more pressing to perform maintenance timely and quickly. The less time workmen are required to spend on the right-of-way, the quicker the work is done, and the greater the amount of work that can be performed by men working on vehicles which may be provided with flashing warning lights, the safer the conditions will be, both for the workmen and the highway users.

The present invention solves the problems above set forth by providing a vehicle-mounted apparatus for supporting spraying and other equipment for the maintenance of highways.

Summary of the invention

The apparatus includes a frame adapted for mounting on a vehicle, such as a highway maintenance truck. Hingedly mounted on the frame is a laterally extending boom, movable by hydraulic cylinders. The hydraulic cylinders are operable to position the end of the boom near a guardrail. Mounted on the end of the boom is a guide box, housing a pair of contoured rollers which engage the face of the guardrail, and as the vehicle is driven along the guardrail, the guide box rollers pilot on the guardrail to maintain positioning of the end of the boom. Spraying, coating, sandblasting, and other apparatus mounted on the boom, the guide box, or on an auxiliary frame attached to the boom may be rapidly moved along the guardrail and maintained in the proper position to perform the intended tasks.

Brief description of the drawings

The full nature of the invention will be understood from the accompanying drawings and the following description and claims.

FIG. 1 is a plan view of one embodiment showing generally the location of the apparatus as mounted upon a truck and the relative position of the truck and the guardrail when the apparatus is in use.

FIG. 2 is a partial enlarged plan view showing the mounting frame, the boom, and the horizontal positioning cylinder.

FIG. 3 is a greatly enlarged fragmentary right side elevation view partially in section of a portion of the mounting frame showing the location and coupling of the vertical positioning cylinder.

FIG. 4 is an elevational view of the guide box showing one embodiment of the leveling means.

FIG. 5 is a sectional view of the guide box showing the contoured rollers.

FIG. 6 is a plan view of the guide box partially in section, taken at line 6—6 in FIG. 4.

FIG. 7 is similar to FIG. 4 and shows another embodiment of the leveling means.

FIG. 8 is an elevational view of the auxiliary frame.

FIG. 9 is a plan view partly in section and taken along the line 9—9 of FIG. 8.

Description of the preferred embodiments

Referring to the figures, in the preferred embodiment, a frame 11 is mounted on a vehicle 12, such as a truck. Attached to the frame by means to be later described are a boom 51, a horizontal positioning cylinder 61, a horizontal cylinder travel bracket 17 and a boom travel bracket 18. Attached to the remote end of the boom is a guide box 71.

The frame 11 in the preferred embodiment of the invention is constructed of angle iron members and is supported by mounting brackets 13 and lower frame supports 14. The mounting brackets 13 are fixedly connected to the frame 11, preferably by bolts. The mounting brackets are preferably made of channel iron and are sized to overlie the channel mambers of the vehicle frame such that they may be bolted thereto on all three sides, and should ovrlap the vehicle frame members as much as practicable to maximize the strength of the bolted connection. The lower frame supports 14 are fixedly connected to the lower portion of the frame, preferably by welding, and extend rearwardly and upwardly to connect by bolts to the vehicle frame. A hinge base plate 16 is fixedly connected to the frame 11, as shown in FIG. 2, and supports two hinge halves in a manner to be subsequently described.

The horizontal cylinder hinge 21 is a compound hinge consisting of a hinge half 22 pivotally connected to a center bar 23, which is in turn pivotally connected to the hinge half 24. The hinge half 24 is affixed to the base of the horizontal positioning cylinder 61, which may be double acting pneumatic or hydraulic. The two pivotal axes of the compound hinge 21 are oriented at right angles to each other, the pivotal axis nearer the hinge base plate being vertically oriented to permit horizontal movement and the pivotal axis nearer the horizontal positioning cylinder being horizontally oriented to permit vertical movement. The horizontal positioning cylinder acts to position and hold the guide box so that it will pilot on the guardrail and also to retract the guide box from piloting on the guardrail.

The boom hinge 31 is a compound hinge including two simple hinges 32 and 36. The hinge half 33 of simple hinge 32 is fixedly connected to the hinge base plate 16, preferably by bolts and nuts. The hinge half 34 of simple hinge 32 is affixed to the boom lever 39. The pivotal axis of simple hinge 32 is horizontally oriented to permit vertical movement. The hinge half 37 of simple hinge 36 is affixed to the boom lever and is pivotally connected to hinge half 38, which is fixedly connected to the boom base 52. The pivotal axis of simple hinge 36 is vertically oriented to permit horizontal motion. The boom base 52 is fixedly connected to the boom 51, and to the hinge half 38.

The boom lever 39, as described above, is interposed between and fixedly connected near its upper end to the hinge half 34 and the hinge half 37. The boom lever is made of channel iron in the prefered embodiment.

The vertical positioning cylinder 41 is pivotally supported by means of the pivotal support collar or trunnion 42. The vertical positioning rod 43 is the piston rod of the vertical positioning cylinder 41 and is pivotally connected to the lower portion of the boom lever 39, preferably by means of a pin and clevis, such that the pivotal axis is oriented horizontally, permitting vertical motion.

The boom 51 has a remote end and a proximal end, and is fixedly connected at its proximal end to the boom base 52. The remote end of the boom supports the guide box which will be described in more detail subsequently. The boom is preferably made of box channel iron or other suitable material having high strength to weight ratio.

The guide box 71 comprises a top 72, a bottom 73, and a side 74. Within the guide box are mounted a pair of guide rollers 76. The guide rollers may be formed of a metallic cylinder, covered with suitable rubber or other material which is contoured or shaped to accommodate the face of the guardrail being guided upon as best shown in FIGS. 5 and 6. Other materials may be used to advantage in the rollers, for example, solid metallic rollers may be used to electrically contact the guardrail should an electro-coating process be used. The guide rollers are journaled in the top and bottom of the guide box by means of suitable bearings.

Upon the guide box 71 may be mounted a spray nozzle 75 or other spraying, brushing, sandblasting or treating means. An auxiliary frame 91 (FIG. 8) may be provided to support applicator devices for applying material to the back of the guardrail or the surrounding ground area. The auxiliary frame 91 will be described in more detail subsequentlly.

The guide box mounting bracket 81 comprises a mounting box portion 82 and a boom portion 83. The boom portion 83 is pivotally connected to the boom 51 with the pivotal axis vertically oriented to permit horizontal motion. The guide box portion 82 is affixed to the guide box 71 as shown in FIG. 6. The mounting box portion 82 and the boom portion 83 are rotatably connected with the axis of rotation being horizontally oriented and perpendicular to the side 74 of the guide box. The guide box mounting bracket 81 includes additional positioning means for adjusting the angular position of the guide box 71 with respect to the guardrail 77. In one embodiment of the invention this is accomplished by means of radial lever arms 86 and 87 attached to the two portions of the guide box mounting bracket. An electric motor with a threaded shaft is connected to the arms 86 and 87 as shown in FIGS. 4 and 6. Rotation of the threaded shaft moves the radial arms closer together or farther apart, thus changing the angular position of the guide box 71 with respect to the guardrail 77. FIG. 7 shows another and prefered embodiment of the invention wherein a pneumatic or hydraulic cylinder and piston are pivotally connected to the radial lever arms 86 and 87, and serve the same function as the threaded shaft and electric motor of the embodiment described above.

Referring to FIG. 8, an auxiliary frame 91 is of generally inverted U-shape, having a vertical supporting member 92 which may be affixed by bolts 90 to the side 74 of the guide box 71 of FIGS. 1 and 4 thru 7, as shown in FIG. 8. Affixed to the upper end of the vertical member 92 is one end of a horizontal member 93, which extends rightwardly as viewed in FIG. 8 and when the guide box 71 is positioned so that the rollers 76 engage the face of the guardrail 77, the horizontal member 93 extends over the guardrail. The other end of the horizontal member 93 pivotally supports a pendulum arm 94 and a spring biased dashpot 98.

As may be seen with reference to FIG. 8, the pendulum arm 94 and dashpot 98 each have their respective upper ends pivotally connected to the member 93. The lower end of the dashpot 98 is pivotally connected to a short arm 99 affixed perpendicularly to the pendulum arm 94. It will be seen that this arrangement permits deflection of the pendulum arm 94 as indicated by the double-headed arrow 97. A deflector 96 having a generally diamond shape is affixed to the pendulum arm 94 as shown in FIGS. 8 and 9.

It is to be understood that the embodiments of FIGS. 4, 6 and 7 are merely illustrative and are not intended to limit the means which may be employed to level the guide box with respect to the guardrail.

In operation, the vehicle 12 is driven along the highway adjacent to the guardrail as illustrated diagrammatically in FIG. 1. The guide box is positioned by means of suitable pressure application in the vertical and horizontal positioning cylinders and by the angular positioning means of the guide box mounting bracket such that the rollers 76 are in contact with the face of the guardrail 77 as shown in FIG. 5. Material is applied to the guardrail or the surrounding ground area by means of a spray nozzle 75 or other suitable means carried by the guide box or by the auxiliary frame 91. The boom supports the guide box and the necessary hoses and cables 56 for supplying the power to the angular positioning means of the guide box mounting bracket and the hoses 57 and 58 to supply paint and air respectively to the spray nozzles or other applicator means mounted on the guide box or auxiliary frame. The necessary compressors 26 and generators 27, and the paint supplies 28, and means of controlling the rate of flow of the material to the applicator means, indicated at 29, may be carried on the vehicle 12 as shown in FIG. 1, or may be towed behind it on a trailer.

The apparatus of the present invention permits maintenance operations to be performed at speeds in excess of that which the ordinary crew of several men could perform the same functions. Working speed for the ordinary crews, with one man performing each function, would vary from less than one foot per minute to possibly as high as one hundred feet per minute, depending upon the particular operation he is performing. The apparatus of the present invention will perform the same operations at speeds ranging between 150 and possibly as fast as 1500 feet per minute. The apparatus of the present invention will perform maintenance operations at several times the rate of the heretofore normal working speed. For example, the normal man carrying a spray gun can paint one side of a guardrail at about two miles per hour, or 176 lineal feet per minute. The apparatus of the present invention can paint both sides of the guardrail at speeds well in excess of 176 feet per minute, and simultaneously spray weed killer or other material upon the surrounding ground area.

The rollers in the guide box pilot on and follow the guardrail as the apparatus moves along. The vehicle 12 may be speeded up or slowed down as one of several methods of matching the flow rate of coating material to the applicator means.

When the auxiliary frame is used, the back side of the guardrail as well as surrounding ground area may be treated in addition to any work done on the face of the guardrail. The spring biased dashpot 98 holds the pendulum arm substantially vertical until an obstacle such as a delineator is encountered, whereupon the deflector 96 encounters the obstacle and deflects the pendulum arm 94. After the object is passed, the spring biased dashpot 98 returns the arm 94 to a substantially vertical position, providing sufficient damping to prevent oscillation of the arm 94. The box 95 diagramatically illustrates where additional applicator means may be affixed to apply material to the back side of the guardrail and to the surrounding ground area.

When the apparatus is not in use, it may be retracted, the horizontal positioning rod disconnected from the boom, and swung around against the frame and secured there by the horizontal cylinder travel bracket 17. The boom may then be swung around against the frame and secured by the boom travel bracket 18. In this position, the auxiliary frame, if used, extends forwardly of the truck from the guide box which is carried on the end of the boom near the hinge 21, thus permitting the apparatus to be transported at high speeds in a compact configuration, greatly enhancing the highway safety of the apparatus when in transit.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A method of applying material at highway guardrails comprising the following steps:
   (a) positioning an applicator means relative to the guardrail in the proper position for applying said material;
   (b) transporting applicator means along the length of the guardrail;
   (c) maintaining the proper position of the applicator means relative to the guardrail while transporting the applicator means along the length of the guardrail;
   (d) continuously supplying the applicator means with said material;
   (e) transporting a supply of said material along the length of the guardrail from which the applicator means is continuously supplied; and
   (f) applying said material at speeds in excess of 176 lineal feet of guardrail per minute.

2. Apparatus for applying material at a highway guard-applicator means for applying said material;
   supporting means for supporting said applicator means;
   positioning means coupled to said supporting means and being cooperable with said supporting means to position and hold said applicator means in a predetermined relative position to a guardrail;
   supply means coupled to said applicator means for supplying said applicator means with said material; and
   transportation means for transporting said applicator means, said positioning means, said supporting means and said supply means along the length of said guardrail,
   said positioning means being cooperable with said supporting means to maintain said predetermined relative position during said transporting thereof.

3. The apparatus of claim 2 wherein said positioning means includes a vertical positioning cylinder, a horizontal positioning cylinder and angular positioning means, said angular positioning means being operable, when actuated, to pivot said applicator means around a horizontal axis.

4. The apparatus of claim 2 wherein said applicator means includes a spray nozzle.

5. The apparatus of claim 2 and further comprising:
   guide means piloting on said guardrail and connected to said supporting means near said applicator means to maintain said predetermined relative position of said applicator means to said guardrail.

6. The apparatus of claim 5 wherein said positioning means and said supporting means are cooperable to foldably and retractably stow said positioning means, said supporting means, said guide means and said applicator means upon said transportation means for transportation to and from locations where said apparatus is to be used.

7. The apparatus of claim 5 further comprising means integral with said positioning means for retracting said guide means from piloting on said guardrail.

8. The apparatus of claim 5 further comprising means integral with said supply means for controlling the rate of flow of said material to said applicator means.

9. The apparatus of claim 5 further comprising an auxiliary frame affixed to said supporting means for supporting applicator means on the opposite side of said guardrail from said guide means.

10. The apparatus of claim 5 wherein said guide means includes a pair of horizontally spaced guide rollers contoured to accommodate the face of said guardrail.

11. The apparatus of claim 5 wherein said applicator means includes a spray nozzle, said guide means includes a guide box having a side, top, bottom and a roller journaled in said top and bottom, said roller being contoured to accommodate the face of said guardrail, said supporting means includes a frame having a boom pivotally mounted thereon, said positioning means includes a vertical positioning cylinder, a horizontal positioning cylinder and angular positioning means, said transportation means includes an automobile truck, and said supply means includes a container for said material and a pump mounted on said truck and a hose connecting said pump to said applicator means, said guide box being pivotally connected to said boom for pivoting on a generally horizontal axis perpendicular to the length of said guardrail, and said angular positioning means including power operated means coupled to said guide box and said boom and operable, when actuated, to pivot said guide box about said axis.

References Cited

UNITED STATES PATENTS

| 2,007,603 | 7/1935 | Green | 239—178 X |
|---|---|---|---|
| 2,706,951 | 4/1955 | Carroll | 239—173 X |
| 2,965,304 | 12/1960 | Krause | 239—172 X |
| 2,995,307 | 8/1961 | McMahon | 239—172 X |
| 3,276,695 | 10/1966 | Giardino et al. | 239—176 X |

FOREIGN PATENTS 1,383,940　11/1964　France.

ALLEN N. KNOWLES, Primary Examiner

U.S. Cl. X.R.

239—172, 178

PO-1050
(5/69)

UNITED STATES PATENT OFFICE
CERTIFICATE OF CORRECTION

Patent No. 3,459,373  Dated August 5, 1969

Inventor(s) Vincent A. Koers

It is certified that error appears in the above-identified patent and that said Letters Patent are hereby corrected as shown below:

Column 5, line 42, a portion of the preamble is omitted and should be added so as to read "Apparatus for applyi material at a highway guardrail site comprising:"

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents